W. B. DEMING & H. C. FULLER.

PAINT POT.

No. 11,302. Reissued Jan. 31, 1893.

Witnesses,

J. M. Litherow

J. H. Figgers.

Inventors,

Wm. B. Deming

& Henry C. Fuller;

By their Attorneys,

C. A. Snow & Co.

UNITED STATES PATENT OFFICE.

WILLIAM B. DEMING AND HENRY C. FULLER, OF BENTONVILLE, ARKANSAS.

PAINT-POT.

SPECIFICATION forming part of Reissued Letters Patent No. 11,302, dated January 31, 1893.

Original No. 482,082, dated September 6, 1892. Application for reissue filed October 8, 1892. Serial No. 448,266.

*To all whom it may concern:*

Be it known that we, WILLIAM B. DEMING and HENRY C. FULLER, citizens of the United States, residing at Bentonville, in the county of Benton and State of Arkansas, have invented a new and useful Paint-Pot, of which the following is a specification.

The invention relates to improvements in paint pots.

The objects of the present invention are to simplify and improve the construction of paint pots; to enable different kinds of paint to be carried in the same pot without liability of having one kind of paint mix or spill into another kind; to provide means for holding paint brushes when not in use; to catch the paint dripping from the paint brushes and convey the same back to the paint pot; to provide a handle or bail so constructed as to rigidly or steadily support the pot regardless of the inequalities of the contents of its two compartments; and to so construct said pot as to permit of the pouring of the contents of one therefrom without liability or danger of the escape of the contents of the other compartment.

The invention consists in the construction and novel combination and arrangement of the parts hereinafter fully described, illustrated in the accompanying drawings, and pointed out in the claims hereto appended.

Figure 1:
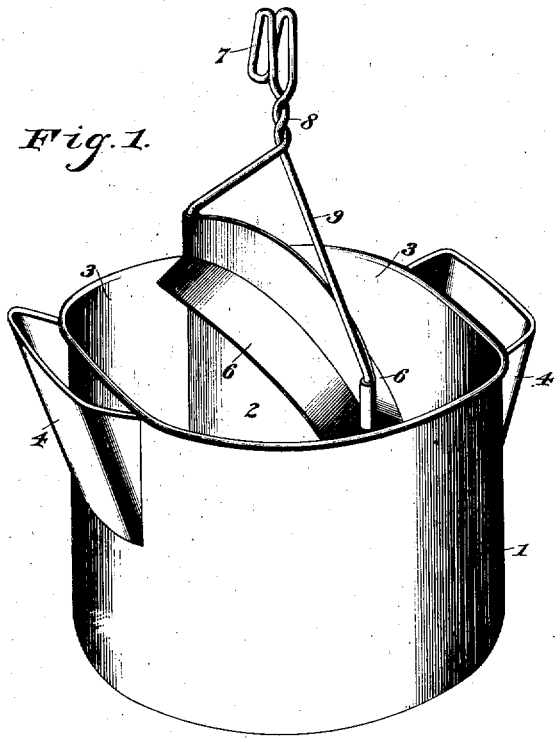
Figure 2:
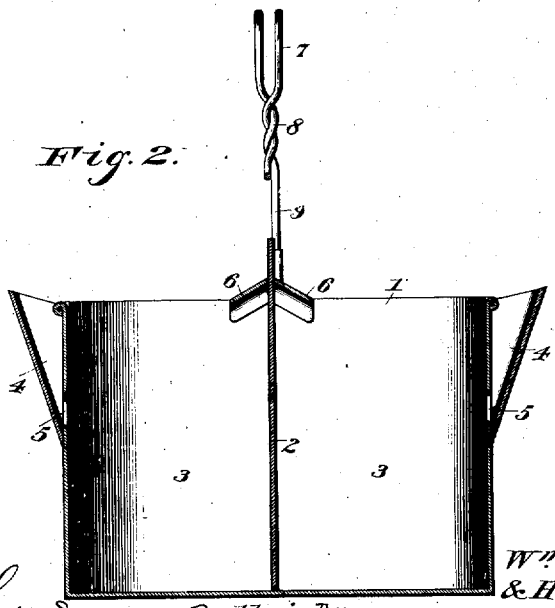

In the drawings:—Figure 1 is a perspective view of a paint pot constructed in accordance with this invention. Fig. 2 is a vertical longitudinal sectional view.

Like numerals of reference indicate like parts in all the figures of the drawings.

1 designates a paint pot constructed of sheet metal and having a transverse partition 2, which divides the paint pot into two non-communicating compartments 3, which enables different kinds of paint to be carried in the same pot. The partition is deeper than the pot, and therefore extends at its upper end or edge some distance above the upper edge of the pot, whereby as will hereinafter appear, the paint in one compartment is prevented from intermingling or communicating in any way, by splashing or otherwise, with that of the other compartment. The paint pot is preferably slightly elongated, making it practically elliptical in horizontal section, and it is provided at its ends with elongated spouts 4, which are arranged at the top, and which taper in width from their tops to their bottoms. Transverse partitions $4^a$ are arranged at the inner ends of the spouts and divide the same from the compartments, said partitions being provided at their lower ends with openings affording communication between the spouts and compartments. By the provision of the partitions, which may if desired be omitted, the spouts are enabled to perform other functions than their names would indicate, namely, as pockets or holders for the loose brushes. By means of the openings in the bottoms of these partitions, the drippings from the brushes are conducted back into the pot.

Near the upper edge of the bucket, the partition 2 below its top edge is provided at opposite sides with slightly downwardly-inclined and nearly horizontally-disposed flanges 6. These flanges aid materially in preventing the contents of one compartment splashing into that of the other, but their prime purpose is to form a guard for the liquid in one compartment and prevent its escape into the other when the pot is tilted for pouring the paint from said other compartment through the spout. To the opposite edges of the partition 2, there is secured the terminals of a suspension-bail 7, the same being preferably formed of wire and rigidly connected in position. This bail has its intermediate portion twisted to form a shank 8. Beyond the shank at the central portion, the strands or terminals are spread or divided and given a common turn, forming a broad, flat hook 9 arranged at a right angle as regards its width with that of the remainder of the bail.

From the foregoing description, in connection with the accompanying drawings it will be seen that we have provided a paint-pot in which two kinds or colors of paint may be simultaneously carried; that the contents of one compartment may be discharged without danger of spilling the contents of the other compartment; that the two compartments are noncommunicative and the contents of one cannot splash or commingle with that of the other; that we have provided a convenient manner of holding loose brushes and conducting the drippings from the same to the proper compartments; and finally that we have provided a suitable bail for supporting the pot upon the rung of a ladder or other support, which bail is made rigid and provided with a wide, broad bearing hook so constructed as when engaging a rung as to co-act with the bail and prevent any rocking or oscillation of the pot and consequent spilling of its contents, whether the compartments be equally filled or not.

Having described our invention, what we claim is:—

1. A paint-pot having a transverse partition located therein, and dividing the same into opposite non-communicating compartments, each of said compartments having a spout at longitudinally opposite points, both compartments being coverless, said partition being deeper than the pot, whereby its upper edge projects above that of the pot, and forms a guard to prevent the splashing or intermingling of the contents of the two compartments, substantially as specified.

2. A paint-pot having a transverse central partition dividing the same into opposite non-communicating compartments, each of said compartments having a spout at longitudinally-opposite points, and both compartments being coverless and substantially horizontal flanges or guards extending from the partition at each side thereof near the edge of the pot, substantially as specified.

3. A paint-pot having a transverse central partition dividing the same into opposite non-communicating compartments, both compartments being coverless said partition being deeper than the pot and extending above the upper edge of the same to form a guard, and provided at its opposite sides over each compartment and near the upper edge of the pot with substantially horizontal flanges or guards extending at an angle to the partition, substantially as specified.

4. A paint-pot having a central dividing partition, and the wire bail rigidly secured at its ends to said partition, said bail having its intermediate portion twisted to form a shank above which its terminals are spread and bent to form a broad bearing, rung-engaging, hook disposed at a right angle to the bail, substantially as specified.

5. The combination of a paint-pot, provided at its ends with openings, the tapering paint-brush receiving spouts arranged at longitudinally opposite points of the pot and communicating with the interior of the same by means of said openings, a transverse partition dividing the pot into two compartments, both compartments being coverless and the inclined flanges arranged at the top of the partition and on both sides of the same, and extending transversely from one side of the pot to the other to form shields to prevent the paint of one compartment splashing into the other, substantially as specified.

6. The combination of a paint-pot, provided at its ends with openings, the tapering paint-brush receiving spouts arranged at the ends of the pot and communicating with the interior of the pot by means of said openings, a transverse partition dividing the pot into two compartments and extending above the upper edge thereof, the curved flanges secured to the partitions and extending therefrom over the compartments and forming shields, and a wire hook having divergent shanks secured to the partition at the opposite sides of the pot, substantially as specified.

7. A paint pot having a transverse partition located therein and dividing the same into opposite non-communicating compartments each of said compartments having a spout at longitudinally opposite points and being coverless, said partition being deeper than the pot, whereby its upper edge projects above the upper edge of the pot and forms a guard to prevent the splashing or intermingling of the contents of the two compartments, and substantially horizontal flanges or guards secured to the partition at each side thereof near the edge of the pot, substantially as specified.

WILLIAM B. DEMING.
HENRY C. FULLER.

Witnesses for W. B. Deming:
W. S. DUVALL,
E. G. SIGGERS.
Witnesses for H. C. Fuller:
T. E. SHEFFIELD,
H. C. SMITH, Jr.